United States Patent [19]

Serini et al.

[11] Patent Number: 4,654,411
[45] Date of Patent: Mar. 31, 1987

[54] HIGH MOLECULAR WEIGHT POLYESTERS, PREPARATION AND USE THEREOF

[75] Inventors: Volker Serini; Bernhard Schulte, both of Krefeld; Werner Waldenrath, Cologne; Dieter Freitag, Krefeld; Uwe Hucks, Alpen; Joachim Wank, Dormagen; Hans-Leo Weber, Rommerskirchen, all of Fed. Rep. of Germany

[73] Assignee: Bayer Aktiengesellschaft, Leverkusen, Fed. Rep. of Germany

[21] Appl. No.: 771,644

[22] Filed: Sep. 3, 1985

[30] Foreign Application Priority Data

Sep. 14, 1984 [DE] Fed. Rep. of Germany ....... 3433756

[51] Int. Cl.$^4$ ............................................. C08G 63/60
[52] U.S. Cl. ..................................... 528/176; 528/179; 528/180; 528/181; 528/182; 528/193; 528/194
[58] Field of Search .................... 528/176, 179–182, 528/193, 194

[56] References Cited

U.S. PATENT DOCUMENTS

| 3,234,167 | 2/1966 | Sweeny | 528/176 |
| 3,246,067 | 4/1966 | Boyer | 528/176 |
| 4,067,850 | 1/1978 | Kohler et al. | 528/176 |
| 4,225,698 | 9/1980 | Medem et al. | 528/176 |
| 4,229,565 | 10/1980 | Gardner et al. | 528/176 |
| 4,438,241 | 3/1984 | Mark et al. | 528/176 |
| 4,477,647 | 10/1984 | Mark et al. | 528/176 |
| 4,482,694 | 11/1984 | Freitag et al. | 528/176 |

FOREIGN PATENT DOCUMENTS

| 8180526 | 4/1982 | Japan | 528/176 |
| 9047255 | 9/1982 | Japan | 528/176 |
| 907647 | 10/1962 | United Kingdom | 528/176 |

Primary Examiner—Lucille M. Phynes
Attorney, Agent, or Firm—Connolly and Hutz

[57] ABSTRACT

Polyesters having at least 90%, by weight, of recurrent structural units corresponding to the following formula:

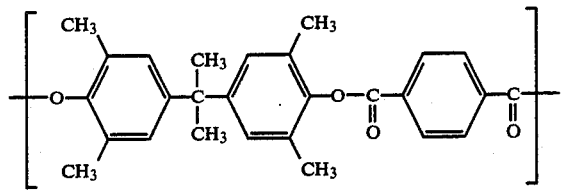

and characterised by a relative viscosity $\eta_{rel}$ of from 1.6 to 4.5 (determined at 25° C. in $CH_2Cl_2$, c=5 g/l) are suitable for the production of films having highly advantageous performance characteristics, in particular high heat resistance.

8 Claims, No Drawings

HIGH MOLECULAR WEIGHT POLYESTERS, PREPARATION AND USE THEREOF

This invention relates to high molecular weight polyesters of 2,2-bis-(3,5-dimethyl-4-hydroxyphenyl)-propane (tetramethyl bisphenol A; TMBPA) and terephthalic acid, to the preparation thereof by phase transfer catalysed polycondensation and to the use thereof for the production of films.

The preparation of thermoplastic polyesters from TMBPA and terephthalic acid dichloride by a two-phase reaction in the presence of a phase transfer catalyst has been disclosed in German Offenlegungsschrift No. 2,802,978. The two phases used in this process consist of a halogenated hydrocarbon and an aqueous alkali solution. Polyesters prepared from equivalent quantities of TMBPA and terephthalic acid dichloride in the presence of a chain-limiting agent have relative viscosities $\eta_{rel}$ of from 1.18 to 1.42 (determined at 25° C. in $CH_2Cl_2$, c=5 g/l).

The viscosities obtained and the corresponding molecular weights are insufficient for certain purposes, for example for high temperature resistant films or sheets.

It was therefore an object of the present invention to provide polyesters from which films having high temperature resistance could be obtained.

It has now been found that this may be achieved by means of polyesters based on TMBPA and terephthalic acid having relative viscosities $\eta_{rel}$ of from 1.6 to 4.5 (determined at 25° C. in $CH_2Cl_2$, c=5 g/l).

The present invention therefore relates to polyesters having at least 90%, by weight, preferably at least 98%, by weight, of recurrent structural units corresponding to the following formula:

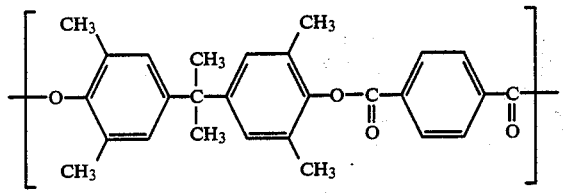

characterised by a relative viscosity $\eta_{rel}$ of from 1.6 to 4.5 (determined at 25° C. in $CH_2Cl_2$, c=5 g/l).

The present invention also relates to a process for the preparation of these polyesters by the reaction of TMBPA, optionally containing up to 10%, by weight, of other bis-phenols, with terephthalic acid dichloride in a diphasic mixture of liquid halogenated hydrocarbon and aqueous alkali solution in the presence of a phase transfer catalyst and optionally a chain-linking agent in a quantity of from 0.1 to 3 mol %, based on TMBPA, characterised in that TMBPA and terephthalic acid dichloride are reacted together in molar ratios of from 1.0000:1.0025 to 1.0000:1.0500 or, if equimolar quantities of TMBPA and terephthalic acid dichloride are used, the polyester is subjected to a post-condensation in the presence of from 0.1 to 20 mol %, based on TMBPA, of a tertiary aliphatic or cycloaliphatic amine, or both measures are employed.

Up to 10%, by weight, of the polyester may consist of units corresponding to the following general formula:

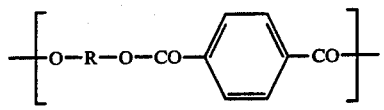

wherein R represents an aromatic group which is different from the group:

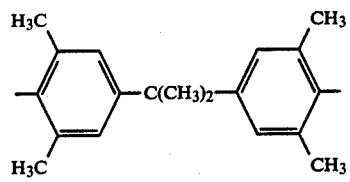

i.e. that they are derived from a different diphenol.

The following are examples of diphenols corresponding to the following general formula: HO—R—OH: hydroquinone, resorcinol, dihydroxybiphenyls, bis-(hydroxyphenyl)-alkanes, bis-(hydroxyphenyl)-cycloalkanes, bis-(hydroxyphenyl)-sulphides, bis-(hydroxyphenyl)-ethers, bis-(hydroxyphenyl)-ketones, $\alpha,\alpha$-bis-(hydroxyphenyl)-diisopropyl benzenes and derivatives thereof which are halogenated or alkylated in the nucleus.

The polyesters according to the present invention are eminently suitable for the production of films characterised by advantageous mechanical and electric properties and high transparency, but especially by the high heat resistance thereof. The glass transition temperature lies in the range of from 250° to 270° C., depending on the viscosity. The films are resistant to soldering baths up to soldering bath temperatures of 260° C.

The films may be produced in thicknesses of from 2 to 200 μm and subsequently stretched at from 240° to 340° C. to reduce the thickness down to 0.5 μm.

The polyester according to the present invention is further distinguished by its high resistance to hydrolysis in water and aqueous alkalis, and it is particularly low in saponifiable chlorine, which is generally below 20 ppm.

The liquid halogenated hydrocarbons used for the diphasic mixture are chlorinated aromatic or aliphatic hydrocarbons, such as chlorobenzene, dichlorobenzene, chlorotoluene, trichloroethane, chloroform or methylene chloride. Aliphatic chlorinated hydrocarbons are preferred: methylene chloride is particularly preferred. The solutions of the polyesters according to the present invention in these solvents have virtually unlimited stability, that is to say no cloudiness, no gel formation and no precipitation of crystalline constituents occurs.

The ratio of organic solvent to water used in the process according to the present invention may vary within relatively wide limits. The ratios of organic solvent to water used are preferably from 1:0.2 to 1:5 parts, by volume, more preferably from 1:0.8 to 1:2, most preferably from 1:1 to 1:1.5 parts, by volume.

The quantity of solvent used is so chosen that the polyester solution obtained on condensation generally contains from 1 to 30%, by weight, of polyester, preferably from 2 to 20%, by weight, of polyester, most preferably from 3 to 10%, by weight, of polyester.

The phase transfer catalysts used may consist of quaternary ammonium salts, quaternary phosphonium salts or crown ethers, as described in the literature. Quaternary ammonium salts are preferred, and tetra-n-butyl ammonium bromide is particularly preferred. The phase transfer catalysts are generally used in quantities of from 0.01 to 10 mol %, preferably from 0.05 to 5 mol %, most preferably from 0.1 to 2 mol %, based on TMBPA.

The following are examples of tertiary aliphatic and cycloaliphatic amines used for the post-catalysis: trimethylamine, triethylamine, tri-n-propylamine, tri-n-butylamine, triisobutylamine, tri-2-ethyl hexylamine, N,N-dimethyl ethylamine, N,N-dimethyl isopropylamine, N,N-diethyl isopropylamine, N,N-dimethyl-2-ethylhexylamine, N-isobutyl-di-(2-ethylhexyl)-amine, N-methyl-ditridecylamine, N,N-dimethyl cyclohexylamine, 1,4-dimethyl piperazine, N,N,N', N'-tetramethylethylene diamine, N-methylpiperidine, N-ethyl piperidine, permethyldiethylene-triamine, 4-methyl-morpholine and 1,2-diazabicyclo-(2,2,2)-octane.

Triethylamine, tri-n-propylamine, tri-iso- and tri-n-butylamine and N-ethyl piperidine are preferred, particularly triethylamine and N-ethyl piperidine. The amines are preferably put into the process in quantities of from 0.5 to 12 mol %, based on TMBPA.

The chain-limiting agents used are monofunctional compounds, such as secondary amines, aromatic acid chlorides and phenols. Phenols are preferred, e.g. phenol, o-, m-, and p-cresol, 2,6-dimethyl phenol, p-t-butyl phenol, and isooctyl phenol. The quantity used is preferably from 0.2 to 1.5 mol %, most preferably from 0.4 to 1 mol %, based on TMBPA.

The relative viscosity $\eta_{rel}$ is preferably from 1.75 to 3.0, most preferably from 2.0 to 2.7. The molar ratio of diphenol to terephthalic acid dichloride is preferably from 1.0000/1.0050 to 1.0000/1.0300. It should be noted that the reactants which are added additionally to the above mentioned reactants because of the chain-limiting agent, are used in a quantity exactly stoichiometric in relation to the chain-limiting agent, e.g. 0.3 mol % of terephthalic acid dichloride (difunctional) when 0.6 mol % of phenol (monofunctional) is used.

The films which may be produced from the polyethers according to the present invention are particularly suitable for use as electrical insulating films, e.g. for the manufacture of condensers and strip conductors. They may also advantageously be used as baking foils and for many other purposes where high heat resistance, resistance to hydrolysis, transparency, good mechanical properties, good electrical properties and low corrosiveness are particularly important.

The films are obtained by casting a $CH_2Cl_2$ solution of the polyester according to the present invention. The solution of polymer in $CH_2Cl_2$ obtained after preparation of the polyester may be used for this purpose if it is separated from the aqueous phase, washed free from electrolyte with water, dried by partial removal of the methylene chloride by distillation and finally adjusted to the desired concentration by evaporation.

It is particularly preferred to use from 2 to 20%, by weight, preferably from 5 to 15%, by weight, solutions for the production of films.

Casting of $CH_2Cl_2$ polyester solution is carried out on tempered drum rollers, which may be matt or polished and are generally at temperatures of from 10° to 40° C. Most of the $CH_2Cl_2$ is evaporated off on the drum roller, but any remaining solvent is then removed on additional tempered rollers, in circulating air driers, by heating surfaces, such as IR radiator arrangements or other heating arrangements, optionally at higher temperatures, e.g. from 80° to 150° C. Any remaining traces of solvent may be removed by further heating, optionally at an even higher temperature. The speed of casting of the films may be varied and is generally from 10 to 1,000 m/hour when drum rollers from 1 to 5 meters in diameter are used.

In addition to the high heat resistance thereof, the films are distinguished by low water absorption. After 24 hours storage at 23° C./50% relative humidity, for example, they have a water content of 0.22%, by weight, and after 95 hours under these conditions, they have a water content of 0.25%, by weight. This is important, for example, if the films are to be used in soldering baths, in which the films are liable to swell up if they have an excessive residual moisture content. When used for this purpose, the films according to the present invention need only be dried for a short time, if at all.

Another advantage of the films is the low energy absorption thereof when exposed to microwaves. In addition, the mechanical properties thereof such as tensile elongation at break, tensile strength and E-modulus, are excellent. Thus, for example, the tensile elongation at break of a 100 μm thick dried film of the polyester having a relative viscosity of only 1.75 is still found to have a tensile elongation at break of 40%. Even higher tensile elongations at break are obtained when the polyester has a higher viscosity. The clear transparency and good electrical properties of the films should also be noted and it is of particular interest that the excellent electrical properties of the films remain constant with temperature and are to a large extent independent of frequency. Another advantage is the high cracking resistance and the resistance to fats. Another property which is important for many applications is the highly isotropic character of the films even after shrinkage processes, as may be shown, for example, from the coefficients of expansion measured in the direction of casting and transversely to the direction of casting. The ease with which the films may be bonded by means of solvents and adhesives is also important.

EXAMPLE 1

8 kg of water and 193 g of a 50%, by weight, sodium hydroxide solution are introduced into the reaction vessel. 284.4 g (1 mol) of TMBPA, 20 g of $CH_2Cl_2$ and 3.2 g (0.01 mol) of tetrabutyl ammonium bromide are added while nitrogen is passed through. When the TMBPA and tetrabutyl ammonium bromide has dissolved, nitrogen is only passed over the surface. After the addition of 6.7 kg of $CH_2Cl_2$, a solution of 205.1 g (1.01 mol) of terephthalic acid dichloride in 812 g of $CH_2Cl_2$ is added at a uniform rate within 5 minutes with stirring. Stirring is then continued for 1 hour. The organic phase is separated off, diluted with $CH_2Cl_2$, acidified with dilute $H_3PO_4$ and washed with electrolyte-free water. The solution is then concentrated by evaporation and the polyester obtained is dried. The dried polyester is found to have a relative viscosity $\eta_{rel}$ of 2.607 determined at 25° C. in $CH_2Cl_2$, c=5 g/l.

EXAMPLE 2

The procedure is the same as in Example 1, but 1.1 g (0.01 mol) of N-ethyl piperidine are added after the 1 hour of further stirring time, and the mixture is then stirred for 1 more hour. A polyester having a relative viscosity of $\eta_{rel}$=3.802 is obtained.

EXAMPLE 3

The procedure is the same as in Example 2, but 0.80 g (0.0085 mol) of phenol are also added after the addition of TMBPA, and the quantity of terephthalic acid dichloride is increased to 205.9 g (1.0143 mol). A polyester having a relative viscosity of $\eta_{rel}=2.361$ is obtained. When the experiment is repeated 4 times, the polyesters obtained have the following relative viscosities: 2.368; 2.342; 2.365; 2.385.

EXAMPLE 4

The procedure is the same as in Example 2, but using 203.0 g (1.0 mol) of terephthalic acid dichloride. The polyesters obtained have a relative viscosity of $\eta_{rel}=2.553$.

EXAMPLE 5

The polyester solution obtained according to Example 3, which is free from electrolyte and water, is adjusted to a concentration of 10.5%, by weight, of polyester by evaporation of $CH_2Cl_2$. The removal of $CH_2Cl_2$ by distillation under normal pressure in a stirrer vessel is carried out very slowly owing to the high viscosity of the solution and takes about 48 hours. The transparent solution contains no gel particles and no crystallised polyester constituents. It undergoes no change even when left to stand for 2 months.

When the 10.5%, by weight, ester solution obtained by this method has been left to stand for 2 months, it is cast through a slit onto a drum roller 4 m in diameter adjusted to a temperature of 35° C. to form films which are subsequently dried continuously at 130° C. in a circulating air drying oven. Both a film 100 μm in thickness and a film 6 μm in thickness may be produced by suitably adjusting the width of the slot. The films are free from holes, uniform in thickness and transparent.

The 100 μm thick film is found to have the following properties:

| | |
|---|---|
| Water absorption from air (23° C./50% humidity) | |
| 24 h | 0.22% |
| 16 h | 0.25% |
| Glass temperature Tg according to differential thermoanalysis | 268° C. |
| Linear coefficient of expansion | |
| longitudinal | $66 \times 10^{-6} K^{-1}$ |
| transverse | $69 \times 10^{-6} K^{-1}$ |
| Tensile elongation at break $\epsilon_R$ | 68% |
| Tensile strength $R$ | 78 MPa |
| Dielectric constant $\epsilon_R$ at $10^3$ Hz and 20–150° C. | 3.0 independent of temperature |
| Dielectric constant $\epsilon_R$ at 50 - $10^6$ Hz and 23° C. | 3.0 almost independent of frequency |
| Specific volume resistance $\rho_D$ | |
| 23° C. | $1 \times 10^{17}$ cm |
| 150° C. | $4 \times 10^{15}$ cm |
| Shrinkage when tempered at 260° C. | 23% |
| Behaviour in soldering bath at 260° C. after shrinkage at 260° C. | under 0.5% no distortion, no cloudiness, no discolouration, no formation of blisters (= resistant to soldering bath). |
| Response to laminating with copper for use as strip conductor with etching of the copper laminate to form tracks | adherence good (particularly after corona treatment of the film), response to etching good (no change in the film). |

The 6 μm thick film is stretched in the ratio of 1:3 on a heated roller mill with the heating medium at a temperature of about 300° C. Thickness of film after stretching: 2 μm, film has uniform thickness. The film may readily be metallised and used for the production of condensers which are found to have excellent properties. The shrinkage which the stretched film undergoes in the soldering bath is desirable for condensers and the film is not spoilt by the formation of holes or similar damage.

EXAMPLE 6

Example 2 is repeated using the same quantity of a crude, 95%, by weight, TMBPA according to Example 1 of DE-OS No. 2,928,464. The polyester has a relative viscosity of $\eta_{rel}=2.935$.

EXAMPLE 7

Example 2 is repeated using the same quantity of a crude, 93.8%, by weight, TMBPA prepared analogously to Example 1 of DE-OS No. 2,928,443 prepared from commercial, 96.7%, by weight, 2,6-dimethyl phenol and containing 6.1%, by weight, of unknown components and less than 0.1%, by weight, of 2,6-dimethyl phenol and cresols.

The polyester has a relative viscosity of $\eta_{rel}=2.883$.

We claim:

1. A polyester film 2-200 μm thick which comprises at least 90% by weight of the following recurrent structural units:

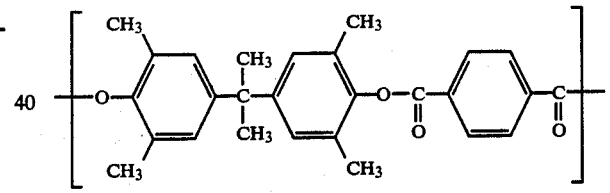

and which has a relative viscosity $\eta_{rel}$ of from 1.6 to 4.5 (determined at 25° C. using a 5 g/l $CH_2Cl_2$ solution).

2. A polyester as claimed in claim 1 wherein the relative viscosity is from 1.75 to 3.0.

3. A polyester as claimed in claim 2 wherein the relative viscosity is from 2.0 to 2.7.

4. A polyester as claimed in any of claims 1 to 3 wherein there are at least 98%, by weight, of the said recurrent structural units.

5. A process for the production of a polyester as claimed in claim 1 which comprises reacting 2,2-bis-(3,5-dimethyl-4-hydroxyphenyl)-propane (TMBPA) and optionally up to 10%, by weight, of one or more other bis-phenols with terephtalic acid dichloride in a diphasic mixture of liquid halogenated hydrocarbon and aqueous alkali solution in the presence of a phase transfer catalyst, the TMBPA and terephthalic acid dichloride being reacted in a molar ratio of from 1.0000:1.0025 to 1.0000:1.0500.

6. A process as claimed in claim 5 wherein from 0.1 to 3 mol % based on TMBPA, of a chain-limiting agent is used.

7. A process as claimed in claim 5 or claim 6 wherein the molar ratio is from 1.0000:1.0050 to 1.0000:1.0300.

8. A process for the production of a polyester as claimed in claim 1 which comprises reacting 2,2-bis-(3,5-dimethyl-4-hydroxyphenyl)-propane (TMBPA) and optionally up to 10%, by weight, of one or more other bis-phenols with terephthalic acid dichloride in a disphasic mixture of liquid halogenated hydrocarbon and aqueous alkali solution in the presence of a phase transfer catalyst, the TMBPA and terephthalic acid dichloride being reacted in substantially equimolar quantities and the polyester produced is subjected to an after-condensation in the presence of from 0.1 to 30 mol%, based on TMBPA, of a tertiary aliphatic or cycloaliphatic amine.

* * * * *